(12) United States Patent
Barzen et al.

(10) Patent No.: US 9,079,517 B2
(45) Date of Patent: Jul. 14, 2015

(54) DUAL CAM RECLINER

(75) Inventors: Johannes Barzen, Pfaffenhofen (DE);
Norbert Hertling, Munich, DE (US);
Eckhard Nock, Schweitenkirchen (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/128,990

(22) PCT Filed: May 31, 2012

(86) PCT No.: PCT/US2012/040119
§ 371 (c)(1),
(2), (4) Date: Dec. 23, 2013

(87) PCT Pub. No.: WO2013/002943
PCT Pub. Date: Jan. 3, 2013

(65) Prior Publication Data
US 2014/0125096 A1      May 8, 2014

(30) Foreign Application Priority Data

Jun. 28, 2011 (DE) .......................... 10 2011 078 216

(51) Int. Cl.
*B60N 2/235* (2006.01)
*B60N 2/427* (2006.01)
*B60N 2/20* (2006.01)
*B60N 2/22* (2006.01)

(52) U.S. Cl.
CPC .............. *B60N 2/42709* (2013.01); *B60N 2/20* (2013.01); *B60N 2/22* (2013.01); *B60N 2/2356* (2013.01); *B60N 2205/20* (2013.01)

(58) Field of Classification Search
CPC .................................................. B60N 2/2356
USPC ................................ 297/367 P, 367 R, 367 L
See application file for complete search history.

(56) References Cited

U.S. PATENT DOCUMENTS

| | | | |
|---|---|---|---|
| 5,590,931 A * | 1/1997 | Fourrey et al. | 297/366 |
| 5,681,086 A | 10/1997 | Baloche | |
| 5,779,313 A | 7/1998 | Rohee | |
| 5,857,746 A * | 1/1999 | Barrere et al. | 297/367 R |
| 6,082,821 A * | 7/2000 | Baloche et al. | 297/354.12 |
| 6,112,370 A * | 9/2000 | Blanchard et al. | 16/325 |
| 6,312,053 B1 | 11/2001 | Magyar | |
| 7,097,253 B2 * | 8/2006 | Coughlin et al. | 297/378.12 |
| 7,150,502 B2 | 12/2006 | Toba et al. | |
| 7,475,945 B2 * | 1/2009 | Reubeuze et al. | 297/367 R |
| 7,578,557 B2 * | 8/2009 | Becker et al. | 297/367 R |

(Continued)

FOREIGN PATENT DOCUMENTS

| | | |
|---|---|---|
| DE | 102004047420 | 5/2006 |
| DE | 102008018623 | 10/2009 |
| DE | 102009032904 | 11/2010 |

OTHER PUBLICATIONS

International Preliminary Report on Patentability for PCT/US2012/040119 dated Jan. 7, 2014.

(Continued)

*Primary Examiner* — Peter Brown
(74) *Attorney, Agent, or Firm* — Brooks Kushman P.C.

(57) ABSTRACT

A vehicle seat recliner that includes a load bearing cam and an anti-chucking cam that act upon a plurality of latches to lock the recliner in a selected position. The load bearing cam is connected to the anti-chucking cam with a lost motion connection.

9 Claims, 4 Drawing Sheets

(56) References Cited

U.S. PATENT DOCUMENTS

| | | |
|---|---|---|
| 7,669,931 B2 | 3/2010 | Tarusawa et al. |
| 7,677,666 B2 | 3/2010 | Grable |
| 7,784,872 B2 | 8/2010 | Kienke et al. |
| 7,828,385 B2 | 11/2010 | Reubeuze |
| 7,828,386 B2 | 11/2010 | Reubeuze et al. |
| 7,874,622 B2 * | 1/2011 | Okazaki et al. ........... 297/367 R |
| 8,602,498 B2 * | 12/2013 | Yamada et al. ........... 297/367 L |
| 2011/0057493 A1 | 3/2011 | Wahls |
| 2012/0093577 A1 | 4/2012 | Otto et al. |

OTHER PUBLICATIONS

International Search Report for PCT/US2012/040119, Completed by the U.S. Patent and Trademark Office on Aug. 10, 2012, 3 Pages.

* cited by examiner

DUAL CAM RECLINER

CROSS-REFERENCE TO RELATED APPLICATIONS

This application is the U.S. national phase of PCT Application No. PCT/US2012/040119 filed on May 31, 2012, which claims foreign priority benefits under 35 U.S.C. §119 (a)-(d) to DE 10 2011 078 216.8, filed Jun. 28, 2011, the disclosures of which are incorporated in their entirety by reference herein.

TECHNICAL FIELD

This development relates to a vehicle seat reclining mechanism.

BACKGROUND

Vehicle seats are provided with reclining mechanisms that, among other functions, permit the seatback of the vehicle seat to be moved to different angular orientations relative to the seat base and retained at a selected position. Without making any representation as to the scope or content of the prior art, applicants acknowledge that the following patents were considered in conjunction with the preparation of this application: U.S. Pat. Nos. 5,681,086; 6,312,053; 5,779,313; 7,150,502; 7,828,386; 7,669,931; 7,677,666; and 7.828,385.

SUMMARY

A recliner for a vehicle seat has a load bearing cam that provides robustness for the recliner mechanism and an anti-chucking cam that resists noise and vibration in the vehicle seat.

The recliner includes a stationary plate that is secured to either the seat bottom or the seatback and a pivotal plate that is secured to the other part of the seat. The pivotal plate is pivotally connected to the stationary plate about a pivot axis. The pivotal plate has a set of radially inwardly extending gear teeth. A plurality of latches are provided that are pivotally connected to the pivotal plate. Pivot connectors are provided that are received in pivot recesses formed in the latches. The latches are provided with a set of radially outwardly extending gear teeth that are selectively engaged with the teeth of the pivotal plate. The load bearing cam and anti-chucking cam together prevent disengagement of the teeth of the latches from the radially inwardly extending gear teeth of the pivotal plate. The load bearing cam resists disengagement of the teeth and backs up the latches in the event a crash load is applied to the seat that is greater than a normal load. The anti-chucking cam operatively engages the latches to resist chucking movement of the seatback. The anti-chucking cam clamps the latches into a locked position in which the teeth of the latches engage the teeth of the pivotal plate. The angle inclination of the seatback relative to the seat base is adjusted by pivoting the load bearing cam and the anti-chucking cam until the gear teeth of the latches disengage the gear teeth of the pivotal plate.

The anti-chucking cam may include a plurality of slots that each receive a protrusion that extends axially from the backup cam to provide a lost motion connection between the load bearing cam and the anti-chucking cam. The load bearing cam has a plurality of backup lobes that each shift into a cutout in one of the latches. The backup lobes engage a finger formed on each of the cutouts that drive the latches into a retracted position in conjunction with the protrusion engaging end of the slot to shift a set of first contact surfaces of the anti-chucking cam away from a set of second contact surfaces on the anti-chucking cam.

The anti-chucking cam may further include a plurality of tangs extending in an axial direction that are each engaged by a spring that biases the anti-chucking cam into engagement with the latches. The anti-chucking cam may also include a plurality of lobes that have first contact surfaces that are oriented at an angle of more than 4°, and for example between 12° and 14°, relative to a circumference of the recliner. The first contact surfaces each contact a second contact surface that is oriented at a complimentary angle relative to the circumference of the recliner on one of the latches to drive the latch into engagement with the teeth of the pivotal plate.

The load bearing cam may have a plurality of load receiving lobes that are spaced to provide clearance relative to the latches when the load bearing cam is in the position in which it backs up the latches. The load bearing cam may also have a plurality of load receiving lobes that have a backup surface that is oriented at an angle that is normal to the surface of the latches that are backed up by the load bearing cam. In addition, the load bearing cam may define at least two slots that each receive a helically wound spring that biases the load bearing cam toward the locked position in engagement with the latches.

To provide easy entry, an arcuate surface feature is provided inside the stationary plate that engages at least one protrusion formed on one of the latches. The latch is held in the refracted position by the protrusion that follows the arcuate feature through a range of motion except for a range of motion corresponding to a comfort adjustment area.

The vehicle seat recliner also provides improved energy absorption. The pivot connector may include a bearing surface that may be deformed to absorb energy in the event of a crash. The pivotal plate also defines integral end stops that confine the latches in an opening direction and in a closing direction. The end stops have guide surfaces that limit movement of each of the latches until a crash load is applied and may be deformed to absorb energy in response to application of a crash load.

The features of the vehicle seat recliner summarized above will be better understood in view of the attached drawings and the following detailed description of the illustrated embodiment.

DETAILED DESCRIPTION

A detailed description of the illustrated embodiments of the present invention are provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
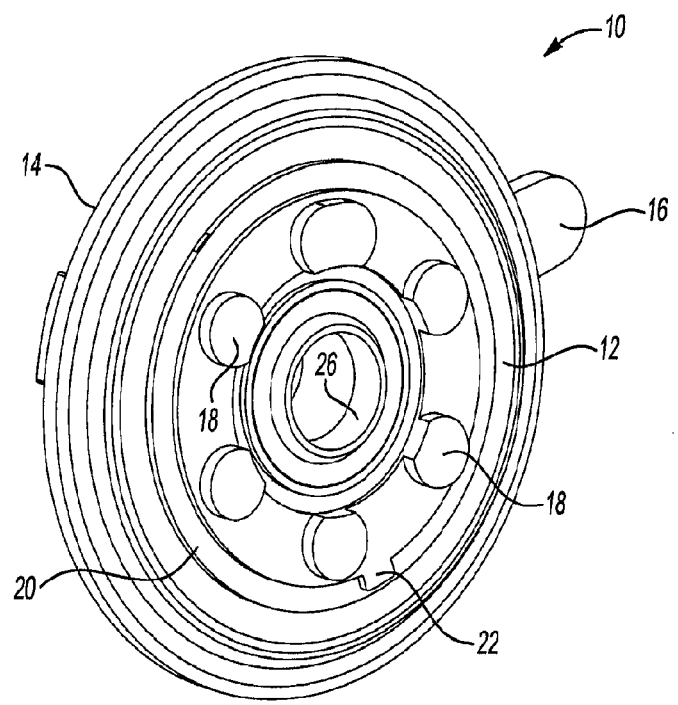
FIG. 1 is a perspective view of a vehicle seat recliner made according to one embodiment of the present invention.

Referring to FIG. 1, a vehicle seat recliner 10 is shown to include a rotary case plate 12 that is rotatable relative to a stationary case plate 14. The rotary case plate 12 is normally attached to the vehicle seatback frame. The stationary case plate 14 is normally attached to the vehicle seat base (not shown). An adjustment lever 16 may be used to engage and disengage the recliner mechanism 10 to change the angle of orientation of the seatback relative to the seat base. Other types of actuating elements may be used, such as a motor or control cable. A plurality of weld flats 18 are provided on the outside of the rotary case plate 12 that are used to weld the recliner 10 to a vehicle seatback.

A circular groove is formed in the rotary case plate 12 that is interrupted by a notch 22. The circular groove 20 is used to provide an easy entry function for the recliner 10 by holding the latches disengaged during rotation of the plates except in the comfort adjustment area.

Figure 2:
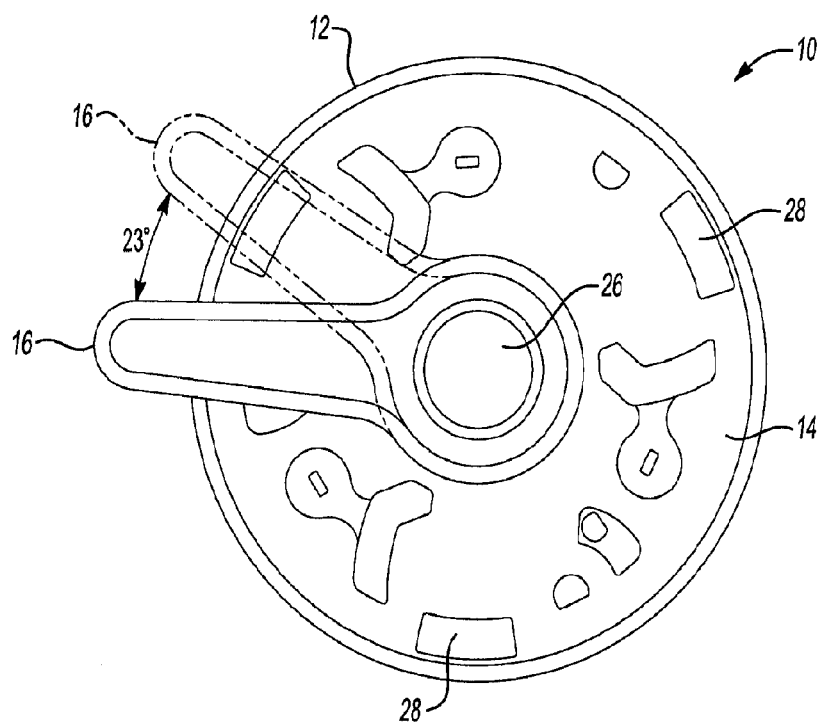
FIG. 2 is a side elevation view of the outer side of the vehicle seat recliner.

Referring to FIG. 2, the outer side of the stationary case plate 14 is shown assembled to the rotary case plate 12 of the vehicle seat recliner 10. The adjustment lever 16 is shown in solid lines and also in phantom lines to illustrate that the lever 16 may be moved as little as 23° from its engaged to disengaged position thereby greatly reducing the amount of travel required to operate the vehicle seat recliner. A hub 26 extends through the vehicle seat recliner and may be used to transmit displacement of the lever 16 to the internal components of the vehicle seat recliner 10. Alternatively, the hub 26 could be eliminated by providing a direct drive connection. Weld flats 28 are provided at three spaced locations on the stationary case plate 14 that are used to weld the vehicle seat recliner 10 to the seat base (not shown).

Figure 3:
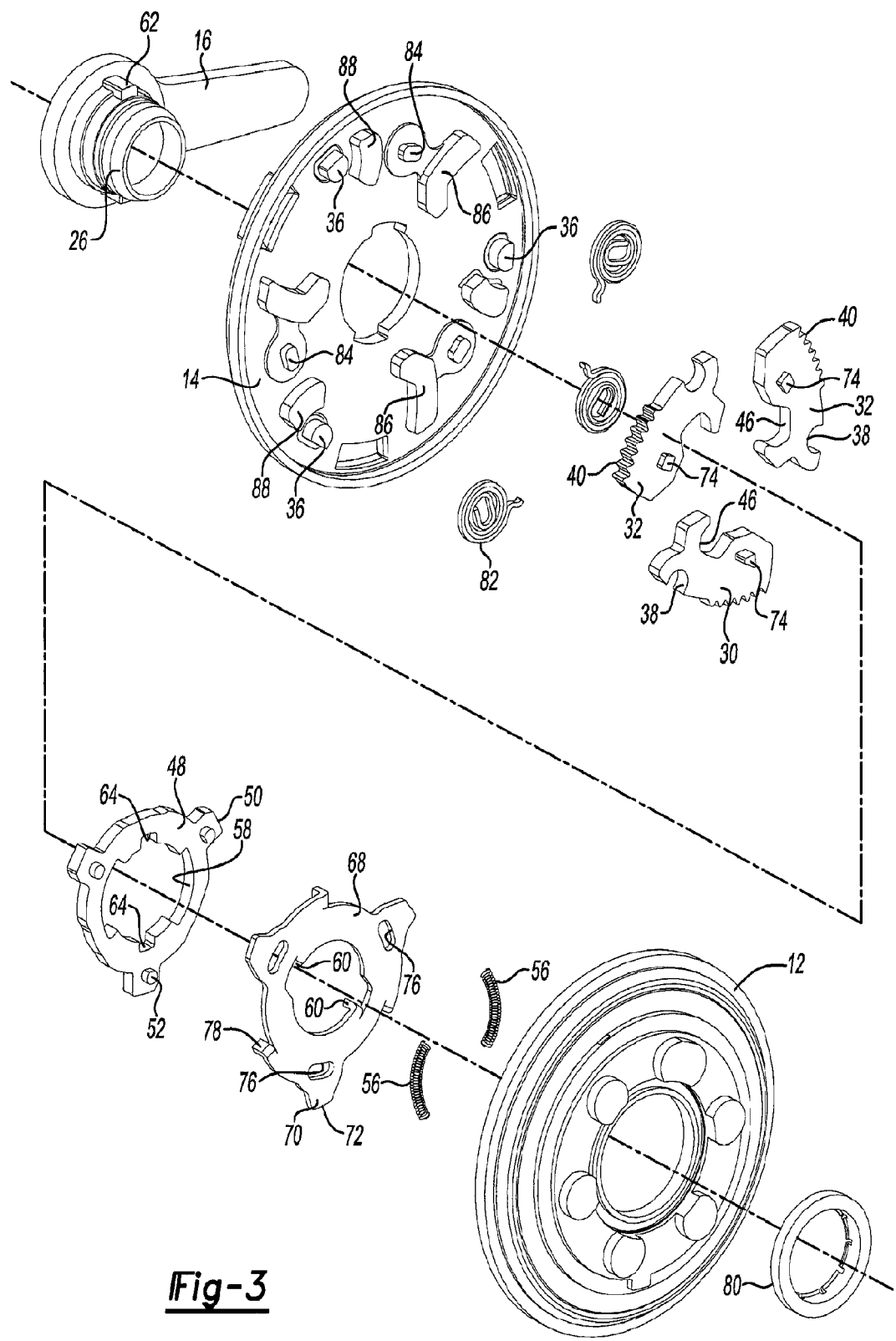
FIG. 3 is an exploded perspective view from the inner side of the vehicle seat recliner.
Figure 4:
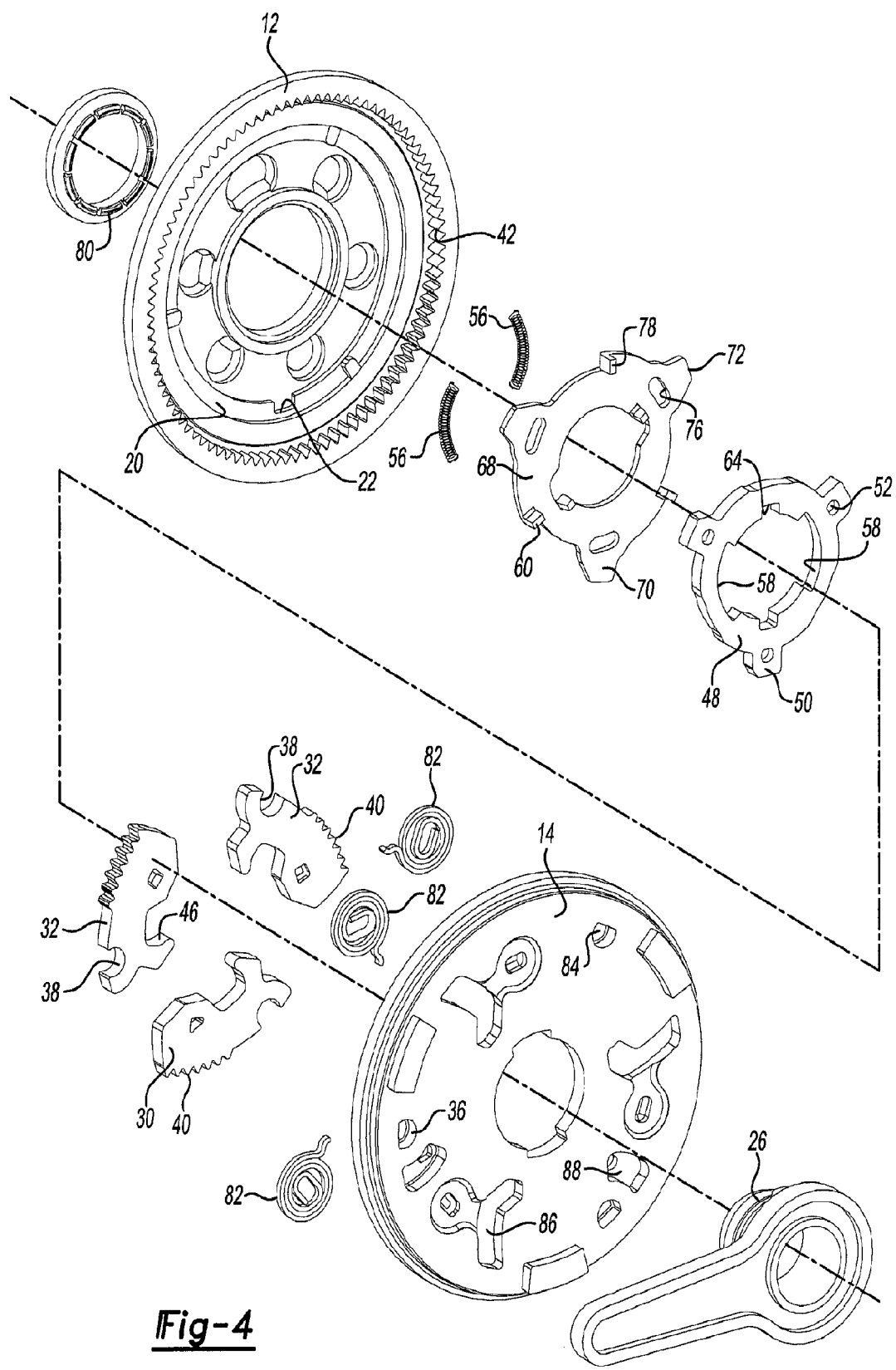
FIG. 4 is an exploded perspective view from the outer side of the vehicle seat recliner.

Referring to FIGS. 3 and 4, the rotary case plate 12 is shown separated from the stationary case plate 14. A master latch 30 and slave latches 32 are received on the stationary case plate 14 at approximately 120° spacing. The master latch 30 and slave latches 32 are each received on a pivot post 36. The latches 30, 32 each include a recess 38 in which the pivot post 36 is received. The recess is generally cylindrical in shape, but may be somewhat oval to reduce the contact between the recess 38 and pivot post 36 to two lines of contact. The latches 30, 32 have latch teeth 40 that engage inner teeth 42, shown in FIG. 4. The latch teeth 40 engage the inner gear teeth 42 to lock the rotary case plate 12 and stationary case plate 14 together when engaged. A refraction notch 46 is also provided on the latches 30, 32 and is used to disengage the latches 30, 32 from the inner gear teeth 42.

The latches 30, 32 are disengaged by rotation of a load cam 48. In the illustrated embodiment, the load cam 48 is rotated by manipulating the adjustment lever 16 or other actuator. The load cam 48 includes a retraction protrusion 50 that is received in the retraction notch 46 when the adjustment lever 16 is rotated. A cam connecting pin 52 extends axially from the retraction protrusion 50. A pair of helical springs 56 are received in an arcuate recess 58 defined in the inner diameter of the load cam 48. Helical springs 56 bias the load cam 48 into its engaged position. The helical springs also engage a stake 60.

Actuator keys 62 are provided on the hub 26 and adjustment lever 16 assembly that is received in keyways 64 formed in the load cam 48.

An anti-chucking cam 68 includes cam locks 70 that define a clamping edge 72. The cam locks 70 define the clamping edges 72 that engage axial protrusion 74 formed on each of the latches 30, 32. The axial protrusion 74 on the master latch 30 is triangular in shape to cooperate with the circular groove 20 and notch 22 formed in rotary case plate (not shown in FIG. 3). The anti-chucking cam 68 defines three lost motion slots 76. The cam connecting pin 52 extending from the load cam 48 are received in the lost motion slots 76. The lost motion slots 76 permit the load cam 48 to be rotated relative to the anti-chucking cam 68 to a limited extent.

A spring tang 78 is provided on the anti-chucking cam 68 that will be described more specifically with reference to FIGS. 5 and 6 below.

A hub retainer 80 retains the component parts of the vehicle seat recliner 10 on the hub 26. It should be understood that the hub 26 may be replaced with a different type of operator if desired to reduce part count. Three clock springs 82 are secured to spring retainer 84 that are integrally formed on the stationary case plate 14. The clock springs 82, or power springs, exert a biasing force on the spring tang 78 of the anti-chucking cam 68. A first set of end stops 86 and a second set of end stops 88 are embossed or otherwise provided by the stationary case plate 14. The end stops guide movement of the latches 30, 32. The end stops 86, 88 also provide energy absorption that may be formed under crash load and increase energy absorption in the seat recliner mechanism.

Figure 5:
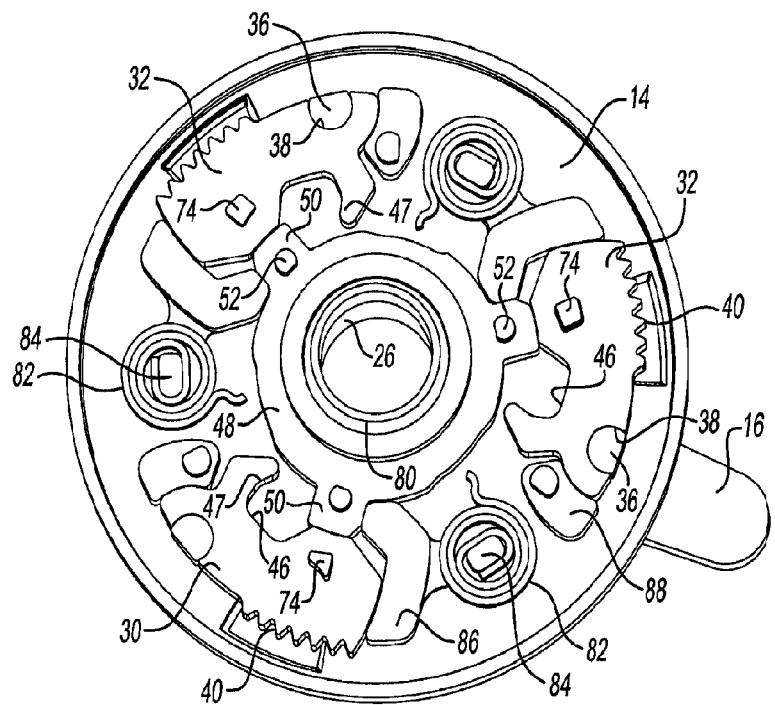
FIG. 5 is an inner side partially assembled view of some of the component parts of the vehicle seat recliner assembled to a stationary case plate.

Referring to FIG. 5, the stationary case plate 14 is shown partially assembled with the load cam 48 holding the master latch 30 and slave latches 32 in their engaged position in which the latch teeth 40 would be in engagement with the inner gear teeth 42 shown in FIG. 4. The load cam 48 is biased into this orientation by helical spring 56, shown in FIGS. 3 and 4, but not visible in FIG. 5.

When the adjustment lever 16 is moved, the hub 26 rotates the load cam 48 in a counter-clockwise direction (as shown in FIG. 5) into the refraction notch 46. The refraction notch 46 includes a finger 47 that is engaged by the retraction protrusion 50 that positively engages the latches 30, 32 to pull the latch teeth 40 out of engagement with inner gear teeth 42 (shown in FIG. 4). The latches 30, 32 pivot about one of the pivot posts 36 that is received in the respective recesses 38.

The end stops 86 and 88 guide pivotal movement of the latches 30, 32. End stop 86 also engages retraction protrusion 50 to limit its rotation in one direction. End stop 88 limits the pivoting motion of the latches 30, 32 by engaging the finger 47 when the latches 30, 32 are rotated by the retraction protrusion 50.

Figure 6:
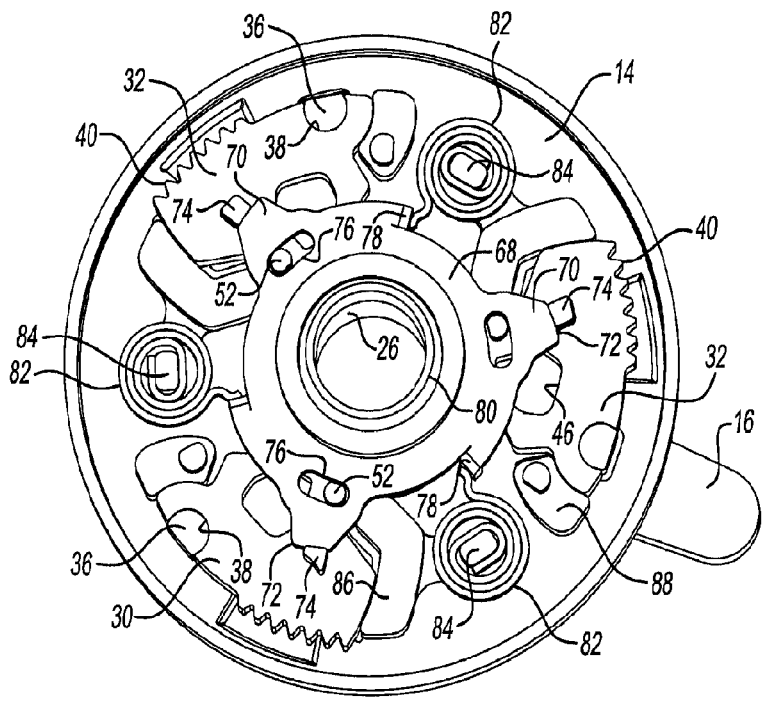
FIG. 6 is an inner side view of a vehicle seat recliner with the rotary case plate removed with all component parts assembled to the stationary case plate.

Referring to FIG. 6, the anti-chucking cam 68 is shown installed over the load cam 48. The anti-chucking cam includes cam locks 70 that define a clamping edge 72. Clamping edge 72 engages axial protrusion 74 to drive the latches 30, 32 into a firm anti-chucking relationship with the teeth 40 engaging inner gear teeth 42 (shown in FIGS. 3 and 4). The cam locks 70 force the clamping edge 72 into full engagement with the axial protrusion 74 and may create a small amount of spacing between the retraction protrusions 50 and the latches 30, 32. The amount of spacing is very limited and may be on the order of $\frac{1}{10}^{th}$ of a millimeter.

The anti-chucking cam 78 is biased by the clock springs 82 that engage a spring tang 78 formed on the anti-chucking cam 68. The clock springs 82 drive the cam locks 70 and their associated clamping edge 72 into engagement with the axial protrusions 74.

Release of the recliner will be described with reference to FIGS. 5 and 6. When it is desired to release the recliner, the adjustment lever 16 is rotated in a counter-clockwise direction, as shown in FIGS. 5 and 6. The motion is transmitted by the hub 26 initially to the load cam 48 by means of the actuator key 62 and keyway 64 shown in FIGS. 3 and 4. The load cam 48 is rotated in a counter-clockwise direction while the anti-chucking cam 68 remains stationary as a result of the lost motion connection. The limited spacing between the protrusion 50 and latches 30, 32 eliminates or minimizes any friction thereby reducing the force required to release the recliner. The lost motion connection is provided by the cam connecting pins 52 that are received in the lost motion slot 76. Rotation of the load cam 48 continues until the cam connecting pins 52 engage the opposite end of the lost motion slot 76. When the cam connecting pins 52 reach the opposite end of the lost motion slot 76, the anti-chucking cam 68 begins to also rotate in a counter-clockwise direction disengaging the clamping edge 72 from axial protrusion 74 as the refraction protrusions 50 are received in the refraction notches 46 and engage the fingers 47. Engagement of the fingers 47 causes the teeth 40 to disengage the inner gear teeth 42 (shown in FIGS. 3 and 4) thereby releasing the rotary case plate 12 for rotation relative to the stationary case plate 14.

Disengagement of the seat recliner is facilitated by the slight spacing between the refraction protrusion 50 of the load cam 58 and the latches 30, 32. At this point, the rotation of the adjustment lever 16 is opposed by the helical springs 56 shown in FIGS. 3 and 4. As the release movement continues at the end of the lost motion, the biasing force exerted by the clock springs 82 must be overcome in addition to the biasing force exerted by the helical springs 56. However, due to the spacing, there is little or no frictional resistance between the load cam 48 and latches 30, 32.

Easy entry is provided by the recliner by the axial protrusions 74 that are held in a coordinated retracted condition as a result of engagement with the circular groove 20 and notch 22 that are formed in rotary case plate 12. When the rotary case plate 12 is rotated, the latches 30, 32 are held by the groove 20 in a disengaged position until the seatback is returned to its normal position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recliner for a vehicle seat, comprising:
a stationary plate that is adapted to be secured to one of a seat bottom or a seat back;
a pivotal plate is secured to the other of the seat bottom or seat back and is pivotally connected to the stationary plate about a pivot axis, the pivotal plate has a set of radially inwardly extending gear teeth;
a plurality of latches each define a pivot recess and are secured on one end to a pivot connector provided on the pivotal plate, the pivot connectors are received in the pivot recesses, the latches are each provided with a set of radially outwardly extending gear teeth that are selectively engaged with the teeth of the pivotal plate;
a load bearing cam is spring biased into engagement with the latches and resists disengagement of the gear teeth in the event a crash load is applied to the seat back that is greater than a normal load; and
an anti-chucking cam disposed adjacent the load bearing cam that resists chucking movement of the seat back by clamping the latches with a set of axial latch protrusions into a locked position wherein the gear teeth of the latches engage the gear teeth of the pivotal plate, wherein the angle of inclination of seat back relative to the seat base is adjusted by rotating a lever that pivots the load bearing cam and the anti-chucking cam until the gear teeth of the latches disengage the gear teeth of the pivotal plate, wherein the anti-chucking cam includes a plurality of slots that each receive an axial cam protrusion that extends axially from the load bearing cam that provide a lost motion connection between the load bearing cam and the anti-chucking cam, wherein the load bearing cam has a plurality of retraction protrusions that each shift into a retraction cut-out in one of the latches, and wherein the retraction protrusions engage a finger formed on each of the retraction cut-outs that drive the latches into a retracted position in conjunction with the axial cam protrusions engaging an end of the slot to shift a set of clamping edges away from the axial latch protrusions provided on the latches.

2. The recliner of claim 1 wherein the anti-chucking cam futher includes a plurality of tangs extending in an axial direction that are each engaged by a spring that biases the anti-chucking cam into engagement with the latches.

3. The recliner of claim 1 wherein the anti-chucking cam includes a plurality of cam locks that have clamping edges that are oriented at an angle of more than 4° relative to a circumference of the recliner that each engage the axial latch protrusions on each of the latches that drive the latch into clamping engagement with the teeth of the pivotal plate.

4. The recliner of claim 1 wherein the load bearing cam has a plurality of load receiving lobes that are spaced to provide clearance relative to the latches when the load bearing cam engages the latches.

5. The recliner of claim 1 wherein the load bearing cam including the retraction protrusions that have a back surface that is oriented at angle that is normal to the surface of the latches engaged by the load bearing cam.

6. The recliner of claim 1 wherein the load bearing cam defines at least two slots that each receive a helically wound spring that bias the load bearing cam toward the lock position and into engagement with the latches.

7. The recliner of claim 1 wherein a circular groove is provided inside the pivotal plate that engages at least one axial latch protrusion provided on one of the latches, wherein the latches are held in a retracted position by the axial latch protrusion that follows the circular groove through a first range of motion except for a second range of motion corresponding to a comfort adjustment area.

8. The recliner of claim 1 wherein the pivot connector includes a bearing surface that may be deformed to absorb energy when the crash load is applied.

9. The recliner of claim 1 wherein the pivotal plate defines integral end stops that confine the latches in an opening direction and a closing direction, wherein the end stops have guide surfaces that limit movement of each of the latches until a crash load is applied and may be deformed to absorb energy in response to application of a crash load.

* * * * *

UNITED STATES PATENT AND TRADEMARK OFFICE
CERTIFICATE OF CORRECTION

| | | |
|---|---|---|
| PATENT NO. | : 9,079,517 B2 | Page 1 of 1 |
| APPLICATION NO. | : 14/128990 | |
| DATED | : July 14, 2015 | |
| INVENTOR(S) | : Johannes Barzen et al. | |

It is certified that error appears in the above-identified patent and that said Letters Patent is hereby corrected as shown below:

In the claims

Column 6, Line 41, Claim 5:

After "surface that is oriented at"
Insert -- an --.

Column 6, Line 44, Claim 6:

After "a helically wound spring that"
Delete "bias" and
Insert -- biases --.

Signed and Sealed this
Second Day of February, 2016

Michelle K. Lee
*Director of the United States Patent and Trademark Office*